May 31, 1966  SHINROKU ASHIZAWA ET AL  3,253,524
FLEXIBLE TUBE ASSEMBLY
Filed Jan. 2, 1963  4 Sheets-Sheet 1
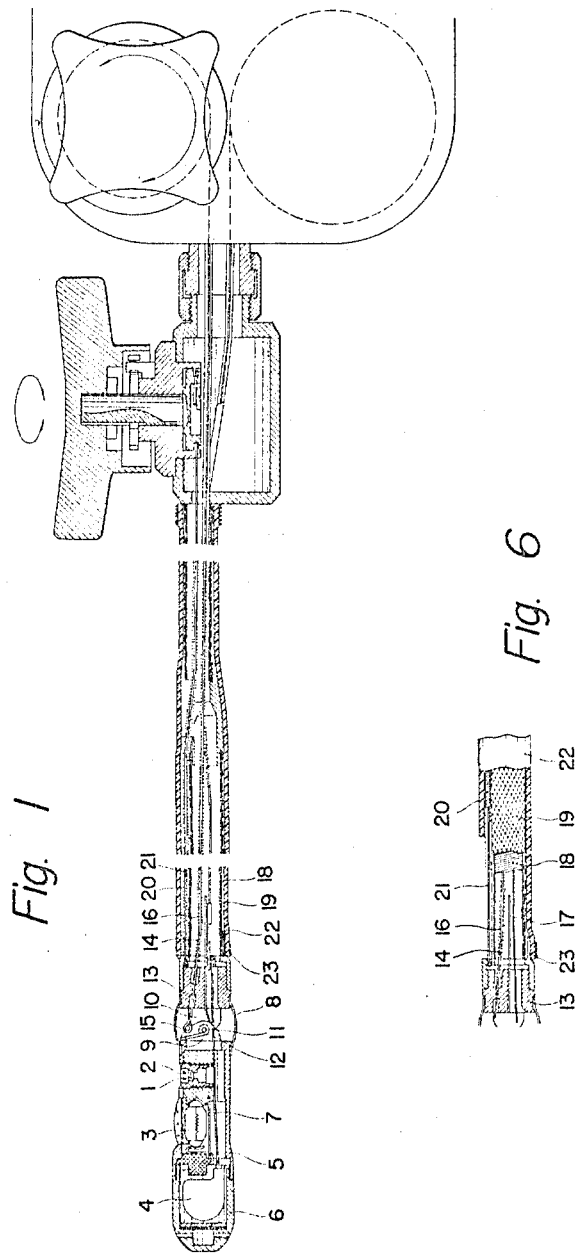
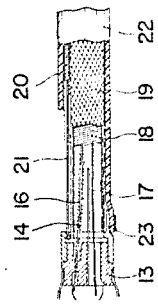
INVENTORS:
SHINROKU ASHIZAWA AND
SHIGERU YAMAKI.
BY: Otto John Munz
ATTORNEY May 31, 1966 SHINROKU ASHIZAWA ET AL 3,253,524
FLEXIBLE TUBE ASSEMBLY
Filed Jan. 2, 1963 4 Sheets-Sheet 2
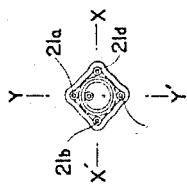
Fig. 5
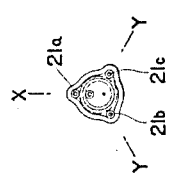
Fig. 4
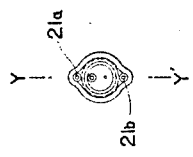
Fig. 3
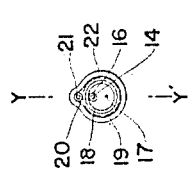
Fig. 2
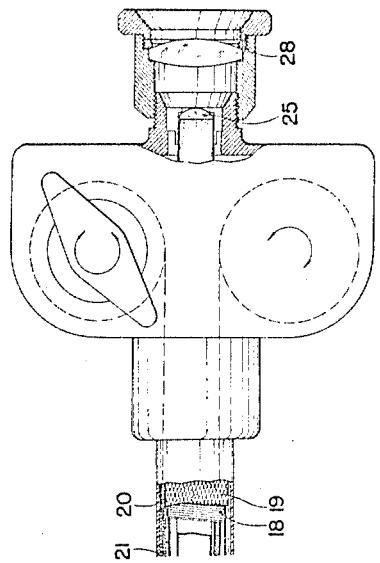
Fig. 7
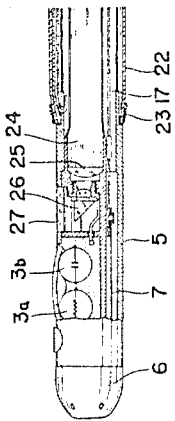
INVENTORS:
SHINROKU ASHIZAWA AND
SHIGERU YAMAKI.
BY: *Otto John Munz*
ATTORNEY.

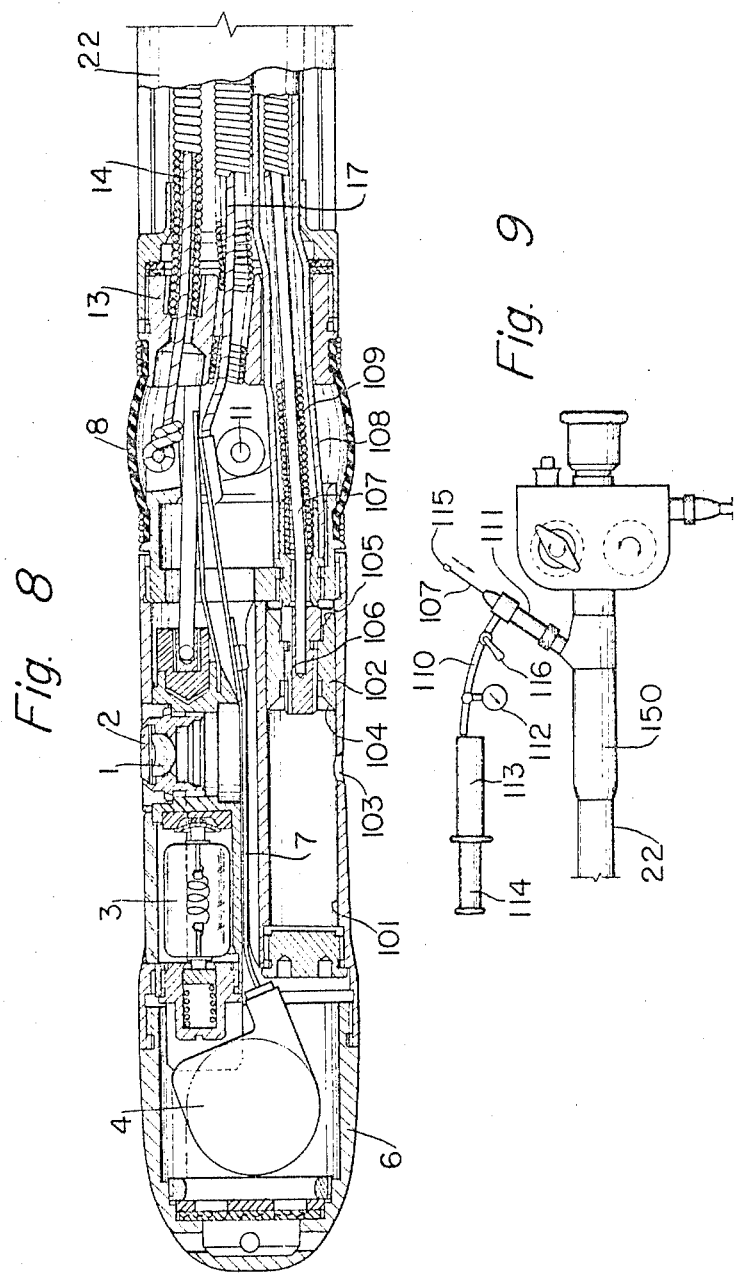

United States Patent Office 3,253,524
Patented May 31, 1966

3,253,524
FLEXIBLE TUBE ASSEMBLY
Shinroku Ashizawa and Shigeru Yamaki, Tokyo, Japan, assignors to Olympus Optical Co., Inc., Tokyo, Japan
Filed Jan. 2, 1963, Ser. No. 252,014
Claims priority, application Japan, May 24, 1962, 37/27,308
3 Claims. (Cl. 95—11)

This invention relates to a flexible tube assembly and probe head means attached thereto, adapted for inserting the latter into a crooked tubing, preferably of a living body, such as a living person, from the open end thereof, to a place to be. probed, for purposes of visual observation, photograph-taking and the like operation so as to inspect precisely the wall surface conditions of the tubing at that place, which is otherwise invisible from outside. This invention is especially advantageous for clinic use in viewing or photographing affected local wall surfaces of stomach, intestines or the like of a human body, but is not limited thereto.

A main object of the invention is to provide a highly improved combination of such a probe head and a flexible tube assembly, the resiliency and head swiveling of which can be easily controlled.

Conventional devices of the kind above referred to are generally so constructed that the flexible tube assemblies thereof are capable of rather substantial bending at a place in the proximity of the attached head. U.S. Patent No. 2,641,977 discloses a considerable improvement in this respect in that the probe head is mounted on a pivot so as to mae a pivotal movement thereabout to some degree and that the flexibility of the tubing is considerably increased so as to give possibilities for yieldably bending thereof to a considerable degree.

Practical experiences have shown however that with use of such conventional devices photographs cannot be normally taken of the critical spots, especially such as formix, cardia, greater curvature, as well as wall surfaces of antrum and lesser curvature of a stomach. In this respect, substantial difficulties have been met, although such work is not absolutely impossible. Clinical photographing technique has therefore not been applied to such important, frequently affected areas of stomach. Same will apply to visual observation and tissue sampling operations for such areas.

According to the present improved technique, a conventional flexible tubing coiled with an elongated elastic element having a circular or non-circular cross-section is fitted longitudinally thereof and on the outside peripheral surface thereof with an elongated element capable of transmitting a tensile or compressive force, the latter element being preferably sheathed loosely with a resilient tubing. The thus formed assembly is further sheathed with a soft, resilient and liquid-proof tubing and the whole tube assembly thus remote-controllable is fixed at its free end with a probe head, comprising a photographing camera, light source means for illumination and photographing, a viewing optical system or a tissue sampler, or any combination thereof.

The operable elongated element, preferably in the form of pullable cord or wire, which may be if desired in plural, is fixed at its one end to the free end of the tube assembly and extends at the opposite end a proper distance from the adjacent end of the assembly to an operator for easy manipulation. When this element is subjected to a manual tensile or compressive force, as the case may be, the tube assembly is caused to bend to a desired degree for proper positioning thereof, so that an improved guidance of the elongated flexible tube assembly can be assured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which:

FIG. 1 is a longitudinal section through a stomach camera head attached with a flexible tube assembly constructed according to the principles of the invention;

FIG. 2 is a cross-section of the tube assembly shown in FIG. 1;

FIGS. 2–5 are similar to FIG. 1 and illustrative of cross-sectional views of several modifications from the embodiment shown in FIG. 1;

FIG. 6 is part of the longitudinal section of a second embodiment of the invention;

FIG. 7 is part of the longitudinal section of a third embodiment of the invention, the head unit of which comprises a stomach camera and fiber-scope;

FIG. 8 is an enlarged view of an embodiment of the invention showing a camera, light source, and tissue sampler at one end of the assembly;

FIG. 9 illustrates the opposite end of the assembly shown in FIG. 8;

Figure 10:
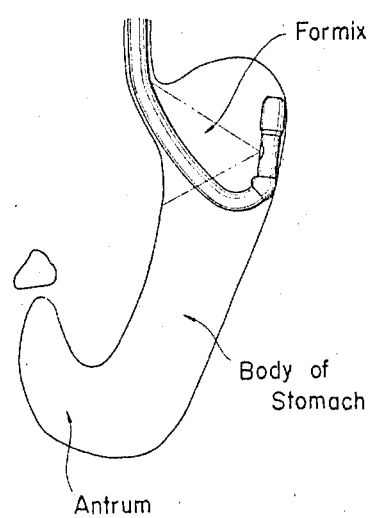
FIGS. 10–12 are explanatory diagrams illustrative of several different positions of a probe head unit for clinical inspection of several local wall surfaces of a stomach of a human being.

Now referring to the accompanying drawings, especially FIGS. 1 and 2 thereof, 18 represents a cylindrical flexible hose, comprising an elongated elastic member having a circular or any profile configuration and tightly coiled into a cylinder as shown. In the open tip end of coiled hose 18, a connecting member 13 is tightly and fixedly fitted, which member is provided fixedly with a hinge piece 10. A camera head 5 is provided with a hinge piece 9 and said both pieces 9 and 10 are hinged together by means of a pivot pin 11, thus the camera head being pivotally movable in the plane of FIG. 1. Spring means 12 are tensioned between both hinge pieces 9 and 10 and urges an operating string 14 to extend in its tensioning direction. The hinged connection between both pieces 9 and 10 is resiliently sealed from outside by a rubber coupling 8, which is sealingly attached to said both pieces as shown in FIG. 1. The camera head is fitted therein with a photographing lens 1, a cover glass 2 and a photographing light source 3, and capped with a detachable cap 6 on the tip end of said head. The cap contains a cartridge 4, from which a strip of photographing film 7 extends as shown. The light source is electrically connected to an outside current source (not shown) by means of electric leads although not shown, which extend through the inside space of cylindrical hose 18. The light source may be a conventional tungsten filament lamp, or more preferably a so-called speed light. If necessary, both types of lamps may be simultaneously employed.

In the first embodiment of flexible tube assembly shown in FIGS. 1 and 2, a net tube 19 woven closely from fine flexible wires encloses the hose tube 18 in a tight manner so as to prevent the latter from being twisted. A small coil tube 20 or a fine and thin walled, flexible and soft tube is mounted on the outside surface of the net tube 19 and extends longitudinally thereof; a fine, yet strong cord 21 passes loosely through the interior space of the tube 20. A cover sheath 22 preferably made from polyvinyl or the like synthetic substance, also soft, flexible and liquid-tight, covers and encloses hose tube 18, net tube 19 and coil tube 20 so as to form a united flexible tube assembly. For assuring a liquid-tight connection between connecting member 13 and cover sheath 22, a fine and smooth binding means may be tightly wound as at 23, if necessary.

Operating cord 21 may comprise a fine metallic wire cord, or an elongated string of flexible steel wire per se, such as piano wire, and is fixedly attached to the tip end of flexible hose 18, or alternatively to the connecting member 13, while the opposite end of said cord or wire is arranged to be subjected to a manual pulling or pressure effort, although not shown, so as to bend the flexible hose from outside when desired by an operator. The embodiment shown in FIGS. 1 and 2 is designed to be adapted to bend in a plane Y-Y' in FIG. 2.

The pulling or pressure cord or wire 21 may be increased in its number. For instance, a second embodiment shown in FIG. 3 is provided with two such elements 21a and 21b so as to provide an increased freedom in bending performance. More specifically, the present embodiment, the intentional bending may be carried into effect in either direction, upwardly or downwarly, as the case may be, in the plane Y-Y', by pulling either element 21a or 21b.

The third embodiment shown in FIG. 4 provides a still further increased freedom in bending. In the present arrangement, there are provided three elements 21a, 21b and 21c, so that the tube assembly may be bent in any selected one of the three planes X-O, Y-O or Z-O, as the case may be.

In the fourth embodiment shown in FIG. 5, the freedom is still further increased. In this arrangement, there are provided four elements 21a, 21b, 21c and 21d, thus giving selective possibilities for intentionally bending the tube assembly in either plane X-X' or Y-Y' and either inwardly or outwardly as desired.

Now referring back to FIG. 1, the camera head may be exchanged for a conventional viewing head, a conventional tissue sampling head or the like means.

In the first embodiment shown in FIG. 1, the camera head is hinged to the tip end of the tube assembly as already described and urged by spring means 12 to rotate counter-clockwise in that figure. When an operator pulls string 14 at its opposite end not shown, he can swivel the head 5 clockwise against the spring action 12 so as to make a relatively sudden directional change. If necessary, it may be possible to connect the head 5 rigidly with connecting member 13 so as to dispense with the hinge connection although this is not shown.

In the fifth embodiment of the invention shown in FIG. 6, provision is made so as to give a possibility of bending the resilient tube at a place in the neighborhood of the free end thereof to a rather high degree. In this figure, similar parts are attached with the same reference numerals as those used in FIG. 1 for better understanding. In contrast to FIG. 1, fine resilient coil 20, in this case, is positioned within the tube assembly, yet the latter is broken away a distance from the forward end of the coil towards the tip end of the assembly so as to keep the corresponding part of pulling cord 21, thereby giving a possibility of sharp and sudden bending of the assembly. More specifically, when the cord is drawn axially from outside, the exposed part thereof is brought into a straight line and thus the aforementioned possibility for sharp bending of the tube assembly can be realized.

In the sixth embodiment of the present invention shown in FIG. 7, the same reference numerals are attached to similar parts as those shown in FIG. 1. In this case, a fiber-scope 24 known per se is arranged within the interior space of the tube assembly so as to extend through the latter as shown. As is conventional, the fiber-scope cooperates with an objective lens 25, a refracting prism 26 and a glass window 27. An operator can observe a magnified screen through said member 27, 26, 25 and 24, and a conventional eyepiece 28. In the figure, 3a and 3b denote light sources for photographing and illuminating purposes, respectively. If necessary, these two separate light sources can be united into one. In the present embodiment, conventional tissue sampling means may also be fitted additionally to the viewing and photographing head explained so far. It may be thus easily conceivable that a clinic head comprising viewing, photographing and tissue sampling means may be attached to the flexible tube assembly described above. A separate combination is also possible as occasion may desire.

Figure 11:
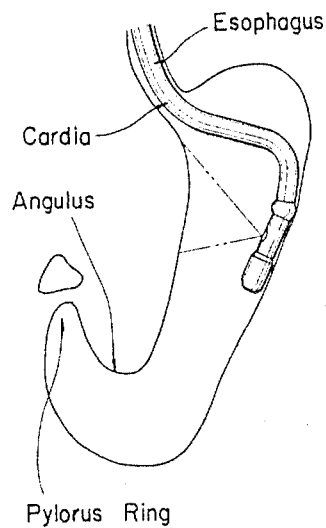
Figure 12:
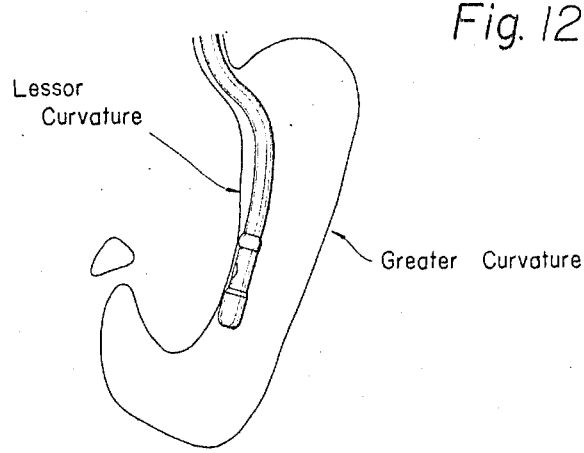

It will now be clear that any combination of camera unit, light source, fiber-scope and tissue sampling means, may be attached to any one of operable and flexible tube assemblies described by way of example hereinbefore. With use of such a device, especially when employing the hinge connection of the intentional swivel movement of the head unit, the tube assembly as a whole or a part thereof can be subjected to a substantial bending so that the unit may be advanced to and positioned at any desired position in a highly crooked tubular organ such as stomach, intestine, trachea or the like by inserting it from outside a living body, for the purpose of visual observation or photograph-taking of a clinical spot. Especially, when the fiber-scope is incorporated, visual inspection of a clinical spot may be carried into effect from outside the living body and an effective positioning of the head unit at the most desired situation within the interior of the body, by manipulating the pulling cord 21 and swiveling string 14. In this way as shown in FIGURES 10 and 11, visual observation or photographing of any clinical spot in the area of fornix, cardia or lesser curvature of a stomach may be easily carried into effect in a sharp contrast to the conventional inside inspection means, which can provide no such flexible possibilities of application. In addition, the head attached to the aforementioned unique tube assembly can be positioned in a tightly contacting position with the wall surface of lesser curvature of a stomach as diagrammatically illustrated in FIG. 12. According to the conventional technique, such a positioning is perfectly impossible and this drawback has long been a serious difficulty in the prior art. It will be thus clear that with use of the present unique device efficient clinical search can be carried into effect without difficulty which means a remarkable progress in the clinical art. Hence, the invention may be applicable to a stomach camera, gastroduodenal fiber-scope, gastrobiopsytube and the like. It may also find its industrial application, for instance, as a defect detector for boiler tubes or other crooked hollow tubular products.

The embodiment of the invention illustrated in FIGS. 8 and 9 is similar to that of FIG. 1 and the same numerals are therefore used to designate like parts. However, this embodiment illustrates a tissued sampler in combination with the features of FIG. 1. The probe is provided with a cylinder 101 having in the wall thereof an opening 103. Slidably mounted in the cylinder is a piston 102 provided with sharp circular cutting edges 104 and 105. The piston is reciprocated in the cylinder by a flexible wire 107 secured thereto at one end and provided with a handle 115 at the other end. The wire is guided by a coiled spring 109 mounted in tube 108. The piston 102 is provided with a conduit 106 communicating both sides of the piston with tube 108. The tube is connected to a fitting 111 secured to a housing member 150. The fitting is connected by a pipe 110 to a vacuum forming cylinder 113 and piston 114. A manometer 112 is connected to the pipe and a cock is inserted in the line. The fitting 111 is in sealing engagement with wire 107. In operation, a vacuum is produced in cylinder 101 by passageways 106 and 108 and vacuum pump 113, 114 to draw tissue to be sampled through opening 103 into the cylinder. The piston is reciprocated to cut the tissue by either cutting edge 104 or 105 and to seal it in the cylinder for later removal.

Without further analysis, the foregoing so well and fully reveals the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the folliwing claims.

What is claimed as new and desired to be secured by Letters Patent is:

1. A probe device for use in inspecting and making photographic records of the inside wall surface of a flexible tubular member, characterized by the combination comprising, an elongated flexible tube in the form of a coil formed of an elongated flexible element, said flexible tube being operable to be bent by means of an elongated cord placed along and outside of said tube in parallel relationship to the axis of said tube, said cord being fixed at one end to the front end of said tube to be inserted into said member and with the other end to be manually pulled from the outside of said member so as to effect the bending of said tube; a flexible sheath surrounding the outside of said flexible tube together with said cord; photographic recording means; a light source; and viewing means; said photographic recording means including cartridge means having a roll of film therein to be successively pulled out linearly of said cartridge means through said flexible tube by means of a cord which is placed through said tube and at one end attachable to said film and is manually operated to pull out said film through said tube from the outside of said member for effecting successive exposures thereon so as to make a film record of selected wall portions through an objective located in position opposite to the passage of said film; said viewing means including image intake portion having light reflecting means for directing the light from said local wall portions into said tube parallel thereto, fiber scope means located through said tube with one end adjacent to said light reflecting means for transmitting the image of said local wall portions received on one end of said fiber scope means from said image intake portion to the other end of said fiber scope means so that the image transmitted to said other end can be viewed through magnifying means of said viewing means; said light source being capable of effecting illumination of said selected wall portions both for successive exposures of said film when said film is pulled out of said cartridge means successively and for viewing through said viewing means, respectively; said photographic recording means, said light source and said image intake portion of said viewing means being attached together in series at the front end of said flexible tube for inserting together through said tubular member.

2. A probe device for use in inspecting and providing a photographic record of the inside local wall surfaces of a flexible tubular member comprising the combination of an elongated flexible tube in the form of a coil formed of an elongated flexible element, said flexible tube being operable to be bent by means of an elongated cord placed along and outside of said tube in parallel relationship to the axis of said tube, said cord being fixed at one end to the front end of said tube to be inserted into said member and with the other end to be manually pulled from the outside of said member so as to effect the bending of said tube; flexible sheath surrounding the outside of said flexible tube together with said cord; photographic recording means; and a light source; said photographic recording means including cartridge means having a roll of film therein to be successively pulled out linearly of said cartridge means through said flexible tube by means of a cord which is placed through said tube and at one end attachable to said film and is manually operated to pull out said film through said tube from the outside of said member for effecting successive exposures thereon so as to make a film record of selected wall portions through an objective located in position opposite to the passage of said film; said light source being capable of effecting illumination of said selected wall portions for successive exposure of said film when said film is pulled out of said cartridge means successively; said photographic recording means and said light source together being pivotably connected to the front end of said flexible tube and normally held at the axial position by a tension cord placed through said tube and at one end attached to a portion offset from the pivot axis against the bias of a spring to tilt said means and light source together in one direction and manually pivoted in opposite two directions from the axial position by changing the tension of said cord from the other end of said cord externally of said member.

3. A probe device according to claim 2 wherein a tissue sampler is attached to the top end of a casing of said photographic recording means.

References Cited by the Examiner

UNITED STATES PATENTS

| 2,641,977 | 6/1953 | Uji | 95—11 |
| 2,975,785 | 3/1961 | Sheldon | 128—6 |
| 3,044,461 | 7/1962 | Murdock | 128—4 |
| 3,074,408 | 1/1963 | Chester | 128—7 X |

FOREIGN PATENTS

| 526,644 | 6/1931 | Germany. | |

JOHN M. HORAN, *Primary Examiner.*